Oct. 17, 1967       B. G. WATTERS ET AL       3,347,335
                    ACOUSTIC-WAVE APPARATUS
Original Filed March 24, 1959                4 Sheets-Sheet 1

INVENTORS
BILL G. WATTERS
GUENTHER KURTZE

BY Rines and Rines
ATTORNEYS

Oct. 17, 1967    B. G. WATTERS ET AL    3,347,335
ACOUSTIC-WAVE APPARATUS
Original Filed March 24, 1959    4 Sheets-Sheet 2
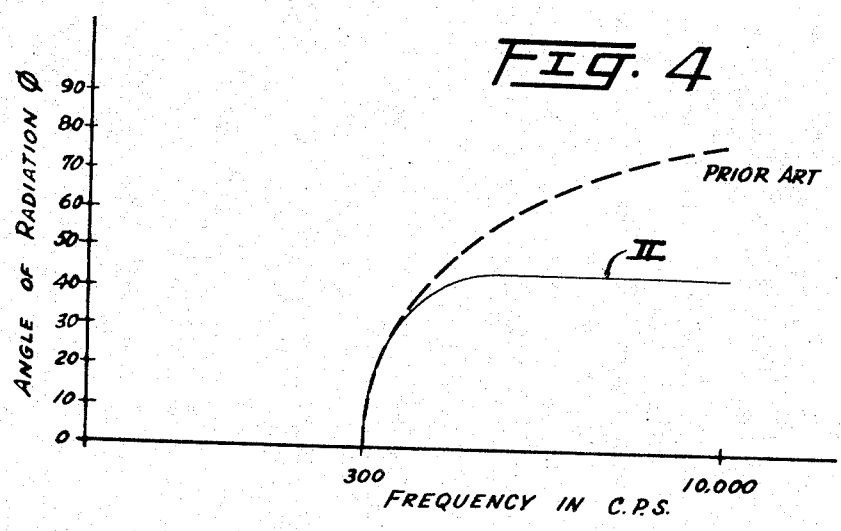
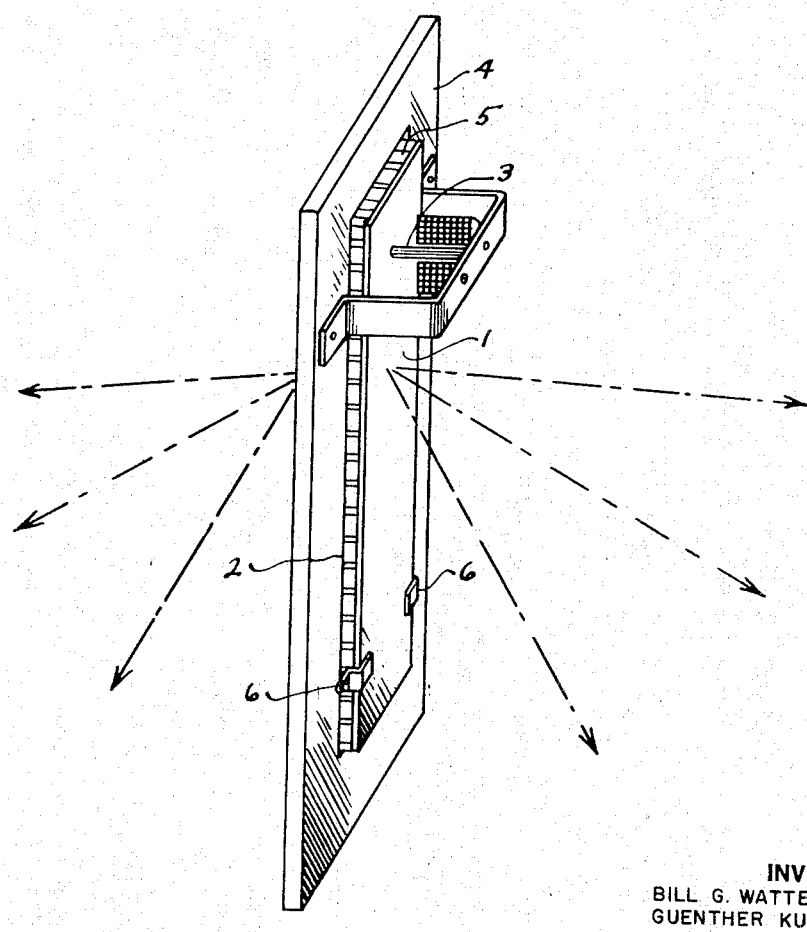
INVENTOR
BILL G. WATTERS
GUENTHER KURTZE
BY *Rines and Rines*
ATTORNEYS INVENTORS
BILL G. WATTERS
GUENTHER KURTZE
BY
*Rines and Rines*
ATTORNEYS

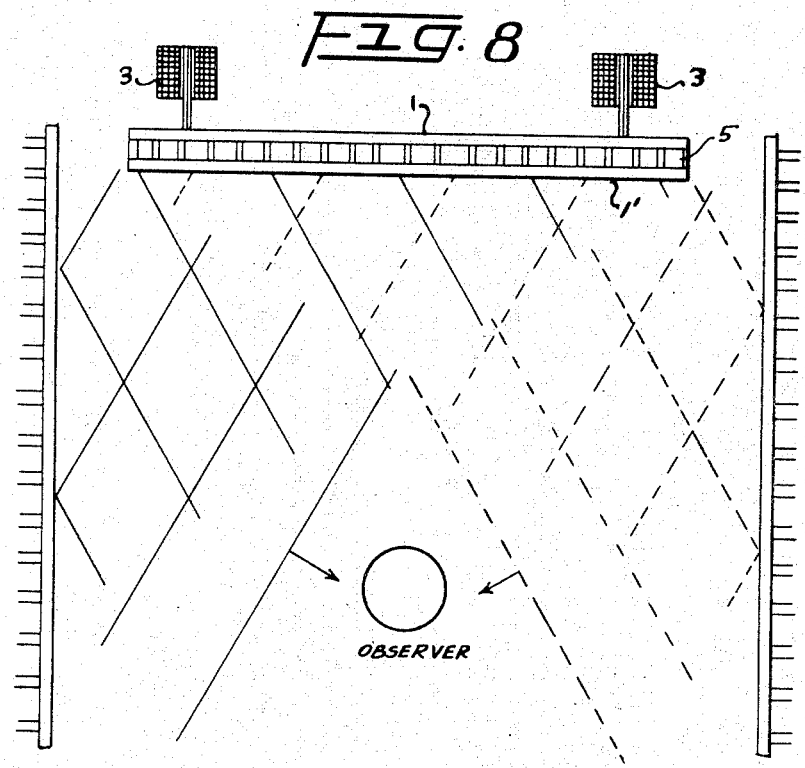
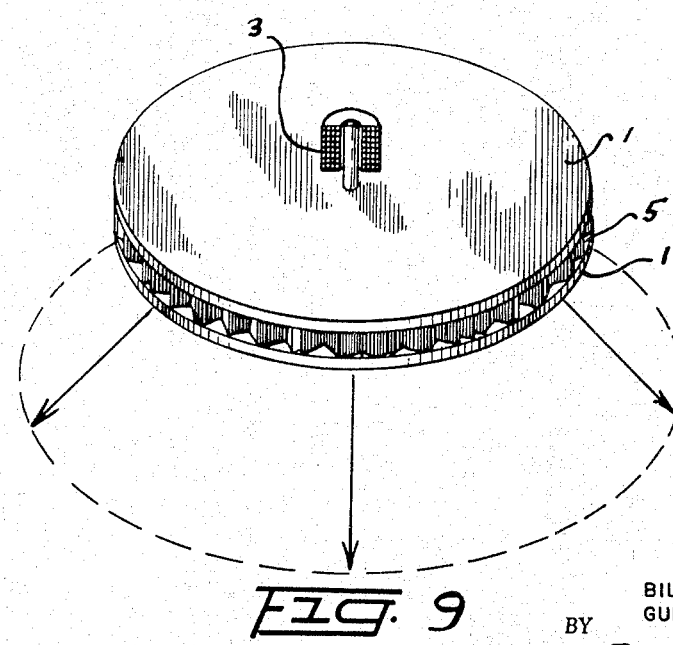

United States Patent Office 3,347,335
Patented Oct. 17, 1967

3,347,335
ACOUSTIC-WAVE APPARATUS
Bill G. Watters, Nahant, Mass., and Guenther Kurtze, Mannheim-Kafertal, Germany, assignors to Bolt Beranek and Newman Inc., Cambridge, Mass., a corporation of Massachusetts
Continuation of application Ser. No. 801,653, Mar. 24, 1959. This application Apr. 5, 1965, Ser. No. 445,603
10 Claims. (Cl. 181—.5)

This application is a continuation of Ser. No. 801,653, filed Mar. 24, 1959, now abandoned, for Acoustic Wave Apparatus.

The present invention relates to acoustic-wave vibrational radiating or receiving apparatus and, more particularly, though not exclusively, to electro-acoustic transducers. The terms "acoustic," "sound" and "vibration," as employed herein, are used in their generic sense to connote not only audible, but super and sub-audibile elastic vibrations, as well.

It has previously been recognized that vibrational bending waves propagating along a plate or bar will radiate acoustic waves into the surrounding medium, such as air or water, provided the velocity of the bending waves in the plate or bar exceeds the velocity of sound in the medium. In the case of a plane bending wave propagating in a plate of infinite size, a plane sound wave is radiated into the medium at an angle of elevation $\phi$ given by the expression, $$\cos \phi = c_m/c_b \qquad (1)$$

where $c_m$ is the velocity in the surrounding medium, and $c_b$, the velocity of bending waves in the plate.

The use of this phenomenon for the development of directive transducers is described, for example, in United States Letters Patent No. 2,063,945, issued Dec. 15, 1936, to George W. Pierce, wherein a driving system is coupled to one of the ends of a plate or bar. When a plate or bar of finite length is so used, a non-reflecting termination at the end opposite to the driving system is necessary since waves reflected from the said opposite end will generate radiation under the angle of elevation of $180° - \phi$, as well. It is also to be understood that, though the description may proceed upon the basis of the illustrated examples of driving systems coupled to the plate or bar and the like, the same type of performance is achieved in receiving systems where the driving system is replaced by a vibration pick-up system.

Assuming the width of the plate or bar to be small compared with the wavelength of the vibrations, and assuming, further, that only one side of the strip is exposed to the surrounding medium (as when the other side is covered by a housing), the acoustic radiation or reception pattern will assume the shape of a cone around the axis of the plate or bar with a total vertex angle of $2\phi$. If, however, both of the radiating sides of the plate or bar are exposed to the acoustic field, a figure-eight-shaped dipole characteristic is superimposed in planes perpendicular to the plate or bar axis, and no radiation or reception is observed in the plane of the plate or bar itself. The width of the radiation maximum in a plane containing the axis of the plate or bar, usually expressed by the spatial angle within which the radiation amplitude is within three decibels from maximum, is a function of the ratio of plate or bar length L and the bending wavelength $\lambda_b$, and generally decreases as this ratio increases. A length $L=\lambda_b$ is about the minimum length necessary to obtain pronounced directivity. For shorter plates or bars, or for larger wavelengths, the radiation or reception pattern of a piston source is approached and the radiation no longer depends upon the before-mentioned condition that $c_b$ be larger than $c_m$. The equation $$L=\lambda_b=c_b/f \qquad (2)$$

where $f$ is the frequency of the bending vibrations, hence determines the lower frequency limit of a directive device of this kind. The upper frequency limit is usually given by the width $w$ of the plate or bar, since the radiation or reception pattern is radically changed when the wavelength becomes smaller than $2w$; i.e., $$w<\lambda_b/2 \qquad (3)$$

The main handicap towards practical use of a directive transducer of this type, however, resides in the fact that the velocity of the bending waves increases with the square root of frequency $$c_b=\sqrt{2\pi f}\sqrt[4]{B/M} \qquad (4)$$

where B is the bending stiffness of the plate or bar and M is the mass per unit area thereof. Hence the angle of maximum radiation $\phi$ is a function of frequency, so that the directivity pattern changes with frequency.

It is accordingly an object of the present invention to adapt such plates or bars or the like for broad-band operation through constructional features that provide for an angle of maximum radiation that remains independent of frequency over a wide frequency band.

A further object is to provide a new and improved radiating or receiving apparatus.

An additional object is to provide a novel transducer.

Other and further objects will be explained hereinafter and will be more particularly pointed out in connection with the appended claims.

The invention will now be described in connection with the accompanying drawing, FIGURE 1 of which is a side elevation of a plate or bar vibrating in the manner beforedescribed to provide for directional acoustic radiation or reception;

FIGURES 3 and 4 are graphs contrasting the performance of the present invention with that of the prior art;

FIGURES 5, 6, 7 and 9 are views similar to FIGURE 1 of modifications; and

FIGURE 8 is a top elevation illustrating the invention employed for stereophonic purposes.

Figure 1:
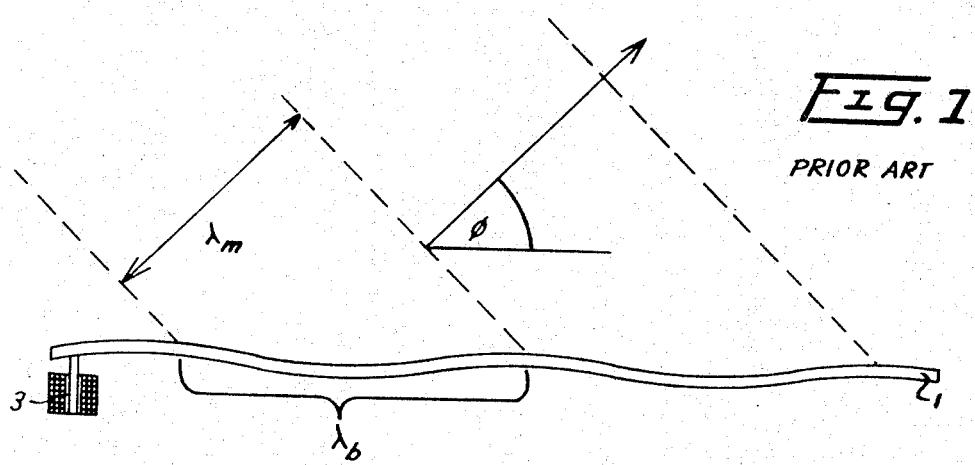

Referring to FIGURE 1, a plate, bar or the like 1, as described in the said Letters Patent, is shown deformed by bending waves of wavelength $\lambda_b$ in the plate or bar 1. The wavelength $\lambda_b$ is greater than the wavelength $\lambda_m$ of acoustic waves in the surrounding medium, such as air or water, so that acoustic radiation or reception occurs directionally at the angle $\phi$, as given by Equation 1, above, and as indicated by the dash-lined wave fronts. The bending waves may be generated by an electromechanical driver 3, such as a magnetomotive or magnetostrictive vibrator, shown disposed near an end of the plate or bar 1. Other types of vibratory devices, including piezoelectric apparatus, may be coupled to the plate or bar 1 to generate the vibrations therein. Conversely, the plate or bar 1 may be set into vibration by an incident acoustic wave and the member 3 may transduce the mechanical vibrations into electrical signals for reception purposes.

As above explained, as the frequency of the vibrations is changed, the velocity of the bending waves and the angle $\phi$ of radiation or reception also change. The square-root variation of bending-wave velocity with frequency (Equation 4) is plotted in the dash-line graph of FIGURE 3, labelled "Prior art," frequency being indicated along the abscissa in units of cycles per second, and bending-wave velocity being plotted along the ordinate in units of meters per second. When the velocity exceeds the horizontal dash line labelled "Velocity of Sound in Air," the directive radiation or reception phenomenon occurs. The variation of the angle $\phi$ of radiation or reception is similarly plotted in the dash-line curve of FIGURE 4. Clearly, then, if the apparatus of FIGURE 1 were to be employed with multi-frequency waves, the radiation or reception pattern would shift for the different frequencies. This renders the device unsuitable for such purposes, for example, as loudspeaker operation and the like.

Figure 3:
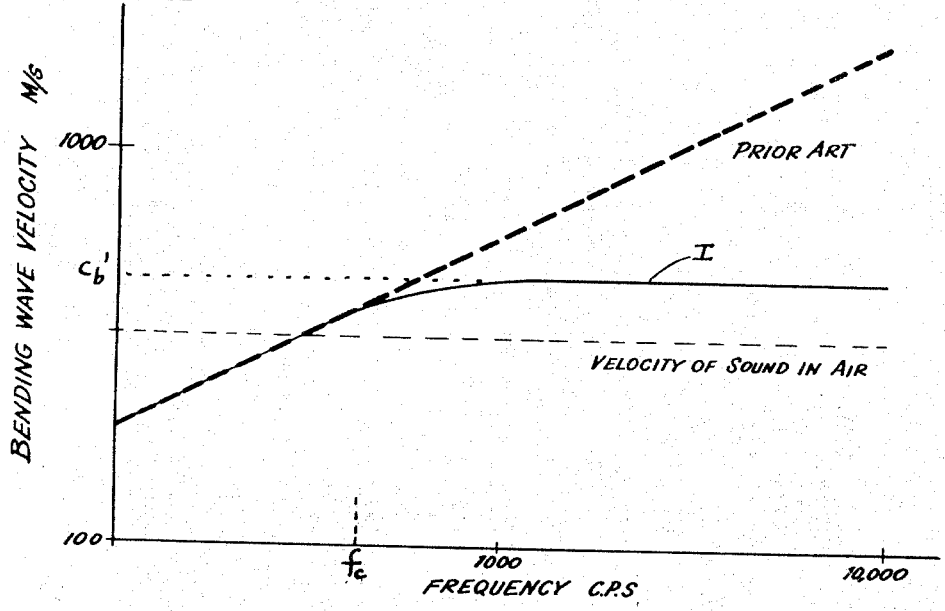

In accordance with the present invention, however, it has been found that appropriately constructed multi-layer plates, strips or the like can be caused to follow the square-root law of Equation 4 only up to a certain critical frequency $f_c$, FIGURE 3; whereas above this frequency $f_c$, the velocity of bending waves remains substantially constant at I over a broad band of frequencies. By proper choice of parameters, the performance of such plates can be matched such that said critical frequency $f_c$ obeys the condition $$f_c \gtrsim c_b'/L \qquad (5)$$

where $c_b'$ is the constant bending wave velocity over the region I. That constant velocity $c_b'$, in turn, must be adjusted such that the desired angle $\phi$ of maximum radiation is given by the relationship $$\cos \phi = c_m/c_b' \qquad (6)$$

Figure 2:
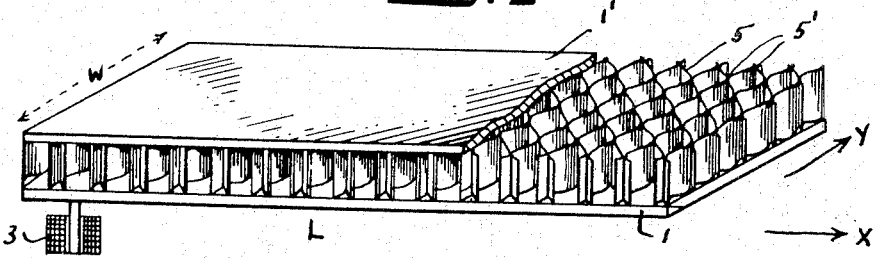
FIGURE 2 is a perspective view, partly broken away to illustrate details of construction, of a preferred embodiment of the broad-band transducer of the present invention.

According to a preferred embodiment of the invention, a suitable multi-layer structure for producing this desired performance is constructed in sandwich form, as shown in FIGURE 2. The structure consists of a pair of opposite spaced stiff skins or surfaces 1, 1' separated by an intermediate core or spacer 5, of much smaller longitudinal stiffness. Thus the effective Young's modulus of the surfaces 1, 1' will be much greater than that of the spacer or core 5.

To achieve the performance of curve I of FIGURE 3, the weight of the strips 1, 1' must be kept small and the shear stiffness of the core or spacer 5 must be chosen to have a certain value. With the shear stiffness of the core or spacer 5 given by the relationship $$S = \mu h \qquad (7)$$

in which $\mu$ is the shear modulus and $h$ represents the thickness of the core or spacer 5, the condition for producing the desired phenomenon can be expressed by the formula $$c_b' = c_m/\cos \phi = \sqrt{S/M} \qquad (8)$$

where M is the total mass per unit area of the strips 1, 1'. The critical frequency ($c_b = c_b'$) is then given by the expression $$f_c = \frac{1}{2\pi} S/\sqrt{MB} \qquad (9)$$

where B is the static bending stiffness of the composite plate 1–5–1'. Under such circumstances the directivity angle $\phi$ will remain substantially constant over a broad band of frequencies above the critical frequency, as indicated at II in FIGURE 4.

As an illustration, when a paper-honeycomb spacer 5 of one inch thickness was employed between the three-mil aluminum foil skins 1, 1', secured thereto, a speed $c_b'$ of about twice the speed of sound in air and a critical frequency of about $f_c = 500$ cycles per second in air was obtained. The composite panel 1–5–1' required a length of about two feet to maintain substantially constant directivity down to the critical frequency $f_c$. The device served as a very adequate loud speaker for audio frequencies applied at the driver 3.

The radiation efficiency can be increased if the width $w$ of the strip is increased. According to Equation 3, however, increased width means a reduced upper limiting frequency. Hence it is useful to apply anisotropic core layers with a higher shear stiffness in the direction normal to the axis of the strip, so that bending wave velocity and wavelength are increased in this direction. The honeycomb type of core or spacer 5, for example, in view of its few cell junctions 5', inherently provides a shear modulus of rigidity in the Y direction, perpendicular to the longitudinal axis X of the panel 1–5–1'; but parallel to the planes of the surfaces 1 and 1', greater than that along the X-axis.

Damping the free or right-hand end of the panel 1–5–1' in order to obtain the necessary non-reflecting termination, before discussed, would involve dissipation of vibrational energy and reduced efficiency of the device. It is, therefore, advantageous to keep the weight of the composite panel 1–5–1' sufficiently low that the radiation damping amounts to between five and ten decibels along the length L of the panel. Little or no additional damping is therefore necessary at the free end. The bending-wave input impedance should be of the same order of magnitude as the total radiation impedance of the panel. This results in bending-wave amplitudes decreasing with distance, producing a widening in the main lobe of the directional radiation or reception pattern. Since, however, the side lobes of the pattern are reduced at the same time, this will generally be considered advantageous.

The angular width of the radiation or reception pattern main lobe depends, as mentioned before, upon the ratio of strip length L and bending wave length $\lambda_b$. Hence the angular width of the main lobe will decrease as frequency increases. This frequency response of the radiation pattern involving constant elevation angles $\phi$ of maximum radiation but frequency-dependent width of the maximum, is at least partly suppressed when the motion of the strip is controlled by vibrational-wave or radiation damping. Since the radiation damping increases with increasing ratio $w/\lambda_b$, the damping increases with increasing frequency so that the effective length of the strip is reduced. In other cases, a constant radiation pattern can be obtained by suitable damping treatments applied to the multi-layer strip, as discussed in the said Letters Patent.

Forward and rearward radiation or reception is provided in FIGURE 5, on the other hand, by isolatingly and freely suspending the composite panel 1–5–1' of FIGURE 2, as at suspensions 6, within an opening 2 in a panel mounting structure 4.

Figure 6:
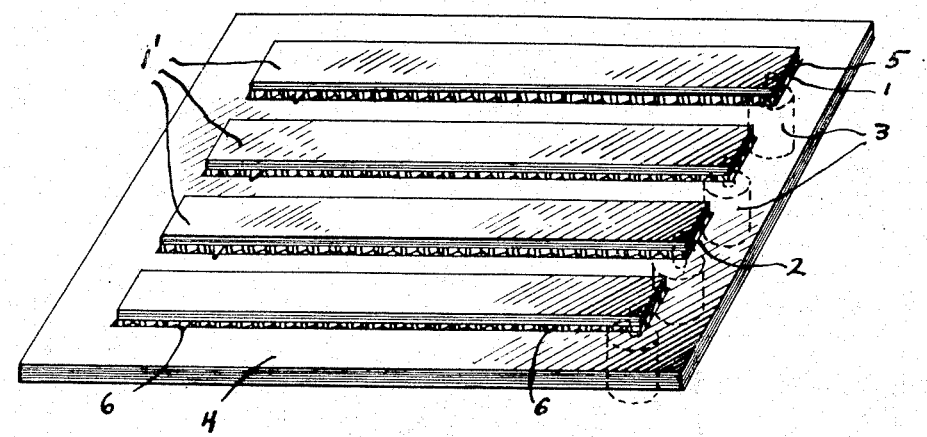

Directivity patterns of almost any kind can be obtained by suitable arrangements of several composite panels 1–5–1' attached to the same or to separate transducers 3. Thus several panels 1–5–1' are shown suspended at 6 in FIGURE 6 within a plurality of substantially parallel spaced openings 2 in a panel mount 4, yielding a uni-directional pattern.

Figure 7:
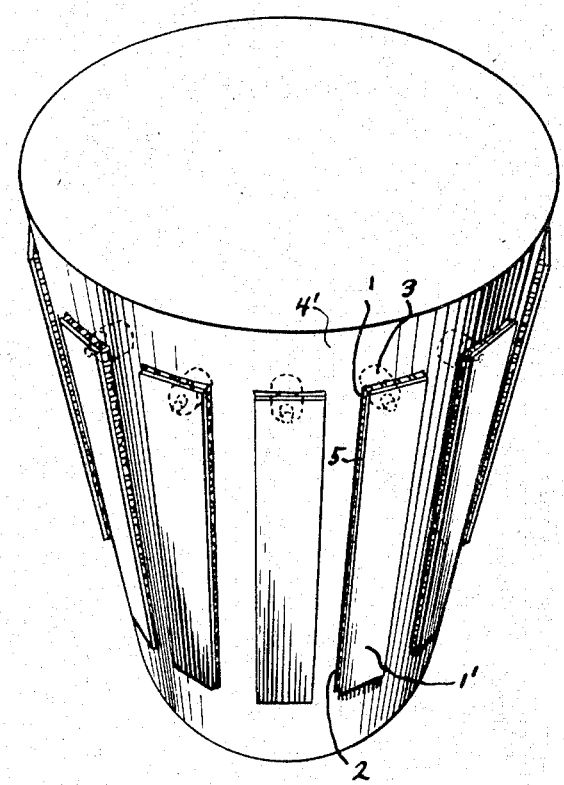

Higher efficiency, attained by increased radiating surface, can be effected by arranging several panels 1–5–1' in one plane like radii of a circle or sector, or by arranging them as shown in FIGURE 7 upon the surface of a cone mount 4', so that radiation into all or part of the plane normal to the axis of the cone is obtained.

The panel 1–5–1' may also be formed in circular fashion, as shown in FIGURE 9, with the transducer 3 coupled to its center, thereby producing a cone-shaped directivity pattern.

If the panel of the present invention is sufficiently damped by its effective mass, it is also possible to detect or radiate different signals under complementary angles, as, for example, by coupling a transducer 3 to each end of the panel 1–5–1', FIGURE 8. These two signals might comprise two components of a stereophonic sound recording, as an illustration. Stereophonic reproduction of this kind would provide the wanted impression to a listener or observer in a position very close to the panel in the range of intersection of the two beams, as well as to a listener or observer in a more remote position, when the strip is arranged between reflecting walls, as indicated in FIG- URE 8. The two side wall-reflected sets of waves are respectively shown in solid and dotted lines reaching opposite ears of the observer.

Other types of surfaces than the sheets or plates 1, 1' may, of course, be employed, as may other types of intermediate regions or spacers or cores 5, though the relative parameters and properties thereof must satisfy the criteria above set forth in order to produce the phenomena underlying the invention. Further modifications will also occur to those skilled in the art and all such are considered to fall within the spirit and scope of the invention as defined in the appended claims.

What is claimed is:

1. A broad-band directional structure for transmitting or receiving acoustic waves at an angle $\phi$ of maximum acoustic response over a band of acoustic frequencies above a crtical frequency $f_c$, said structure comprising an acoustic panel having a pair of stiff longitudinally extending skin layers spaced apart by an intermediate core, and transducer means coupled to a portion of said panel for interchanging electric and acoustic energy in said band of acoustic frequencies, said panel having a length L extending from said portion and said core having a longitudinal stiffness along said length L which is much less than that of said layers, said core having a shear stiffness S along said length and said panel having a mass per unit area M correlated substantially in accordance with the following expressions:

$$c_b' = c_m / \cos \phi = \sqrt{S/M}$$

whereby $c_b'$ is the velocity of bending waves along the length L over said band and is substantially constant, and $c_m$ is the velocity of acoustic energy in the medium surrounding said structure, and $$f_c = \frac{1}{2\pi} S / \sqrt{MB}$$

where B is the static bending stiffness of said panel, the length L of said panel being equal at least to $c_b'/f_c$, and said structure having a directivity pattern with said angle $\phi$ of maximum acoustic response substantially constant over said band of acoustic frequencies.

2. The structure of claim 1, said core having a shear modulus along its width perpendicular to said length L which is substantially greater than its shear modulus along said length L, whereby the velocity of bending waves along said width is greater than along said length.

3. The structure of claim 1, wherein said panel is elongated and said transducer means is coupled thereto near one end thereof.

4. The structure of claim 1, further comprising support means having an aperture and means for freely suspending said panel in said aperture.

5. The structure of claim 1, wherein said panel has means for producing radiation damping along said length L.

6. The structure of claim 1, further comprising another panel like and spaced from the first-mentioned panel and having transducer means coupled thereto.

7. The structure of claim 6, said panels being disposed along a substantially conic surface.

8. The structure of claim 1, wherein said panel is substantially circular and has said transducer means coupled to the central portion thereof.

9. The structure of claim 1, further comprising additional transducer means coupled to a portion of said panel spaced from the first-mentioned portion.

10. The structure of claim 1, further comprising additional transducer means coupled to a portion of said panel spaced from the first-mentioned portion, said transducer means being connected to sources of stereophonic signals.

References Cited

UNITED STATES PATENTS

| | | | |
|---|---|---|---|
| 1,740,651 | 12/1929 | Hueter | 181—31 |
| 2,063,944 | 12/1936 | Pierce | 81—26 |
| 2,063,945 | 12/1936 | Pierce | 181—0.5 |

RODNEY D. BENNETT, *Primary Examiner.*

BENJAMIN A. BORCHELT, *Examiner.*

M. F. HUBLER, *Assistant Examiner.*